United States Patent
Stark

(10) Patent No.: US 7,810,738 B2
(45) Date of Patent: Oct. 12, 2010

(54) CONSTANT AIR VOLUME/VARIABLE AIR TEMPERATURE ZONE TEMPERATURE AND HUMIDITY CONTROL SYSTEM

(76) Inventor: Walter Stark, 3 Connelly Rd., Huntington, NY (US) 11743

( * ) Notice: Subject to any disclaimer, the term of this patent is extended or adjusted under 35 U.S.C. 154(b) by 337 days.

(21) Appl. No.: 12/005,452

(22) Filed: Dec. 27, 2007

(65) Prior Publication Data

US 2009/0166442 A1    Jul. 2, 2009

(51) Int. Cl.
*F24D 19/10* (2006.01)
*F24F 11/00* (2006.01)

(52) U.S. Cl. .................. 236/1 B; 236/49.3; 62/186; 700/277

(58) Field of Classification Search .............. 236/1 B, 236/12.14, 44 C, 49.3; 62/186; 700/277; 165/205, 212
See application file for complete search history.

(56) References Cited

U.S. PATENT DOCUMENTS 6,789,618 B2 * 9/2004 Pearson .................. 165/210
6,792,766 B2 * 9/2004 Osborne et al. ............ 62/159

* cited by examiner

*Primary Examiner*—Marc E Norman
(74) *Attorney, Agent, or Firm*—Alfred M. Walker

(57) ABSTRACT

A method for providing energy-efficient temperature and humidity control with uniform ventilation air distribution in a constant-volume zoned heating and cooling systems. The method utilizes an air-to-air heat exchanger that regulates the temperature of the supply air to a space, using the temperature differential between supply air and return (room) air and regulating the flow of return air through the heat exchanger.

4 Claims, 5 Drawing Sheets

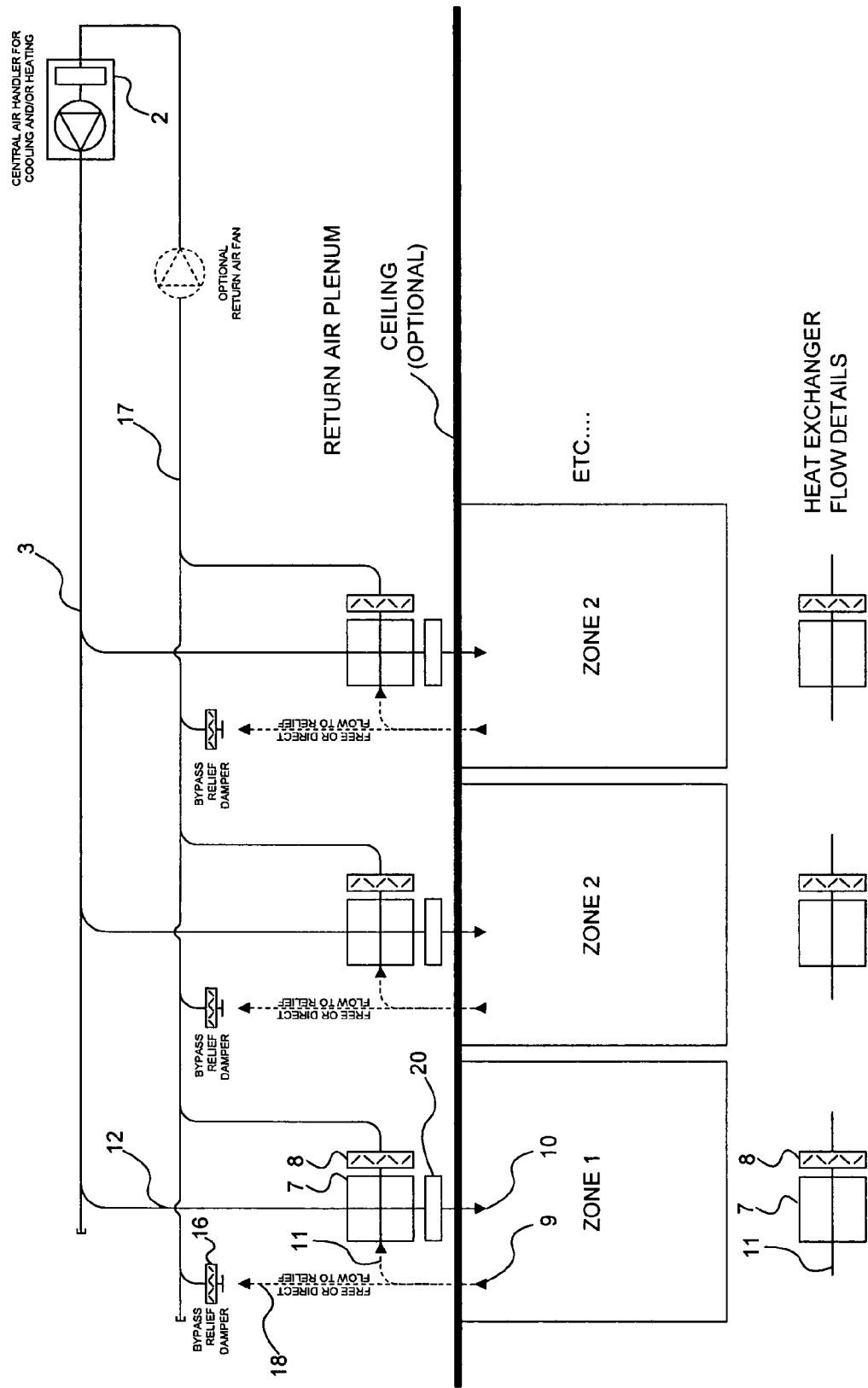

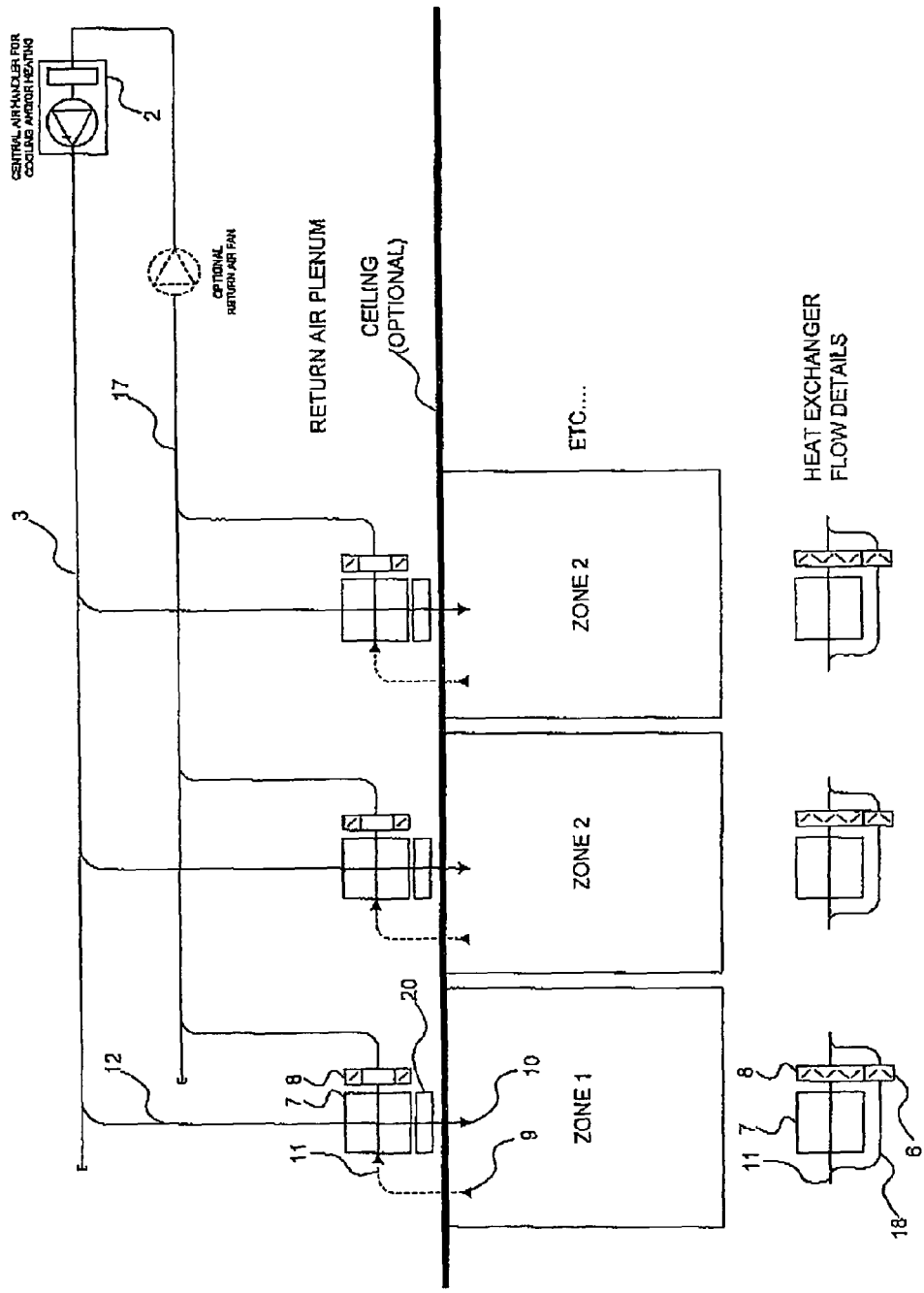

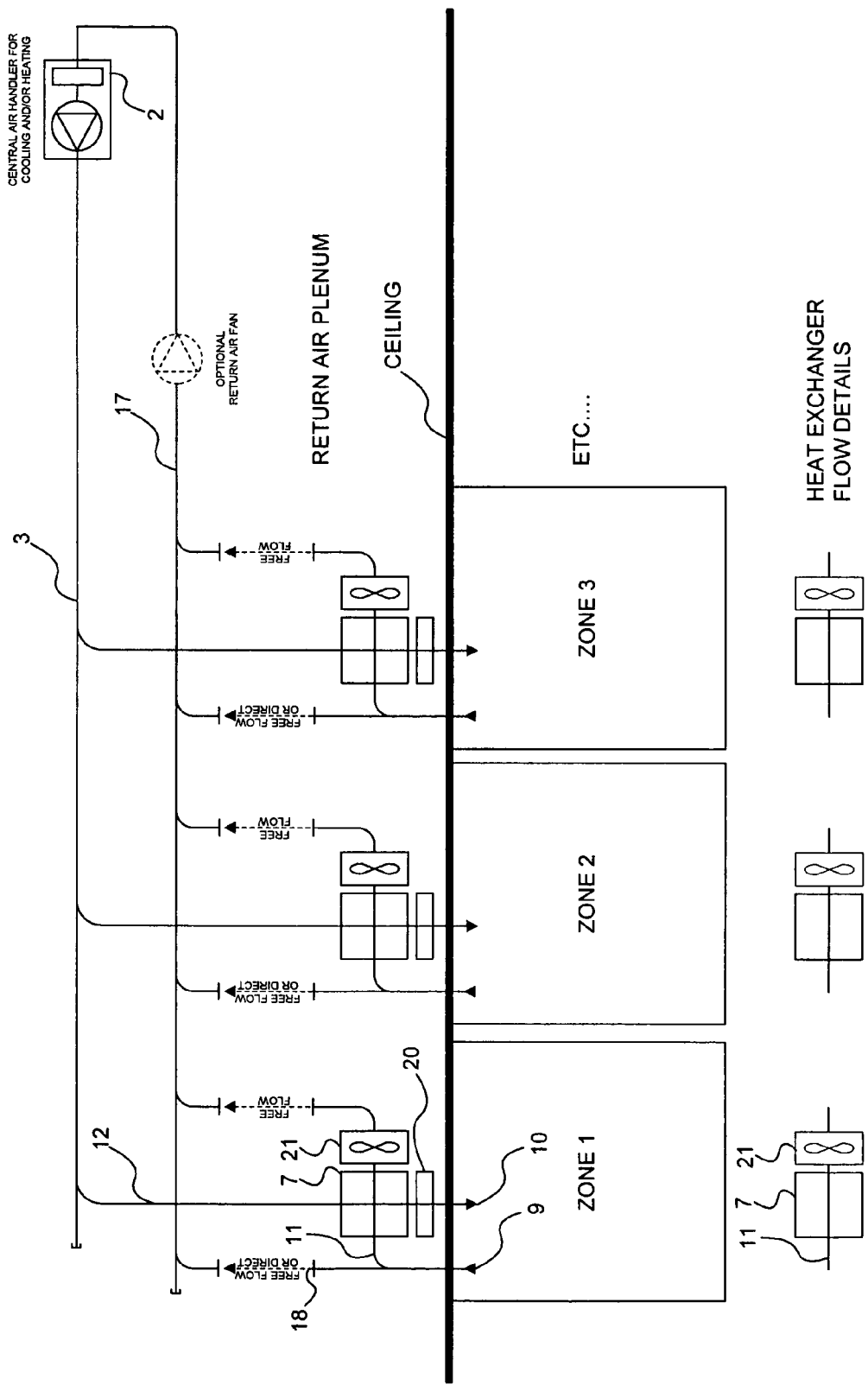

FIGURE 4 – CAVVAT™ COMBINATIONS

| FIGURE | SYSTEM TYPE | MODULATION MEANS | HEAT EXCHANGER IN | EXCESS AIR ROUTE TO RETURN | HEAT EXCHANGER OUT |
|---|---|---|---|---|---|
| 1 | FACE & RELIEF | FACE DAMPER | FREE | FREE TO RELIEF | DIRECT |
| | | | | DIRECT TO RELIEF | |
| | | | DIRECT | FREE TO RELIEF | |
| | | | | DIRECT TO RELIEF | |
| 2 | FACE & BYPASS | FACE & BYPASS DAMPER | FREE | DIRECT THROUGH BYPASS DAMPER | DIRECT |
| | | | DIRECT | DIRECT | |
| 3 | FAN | FAN | DIRECT | FREE | FREE |

FIGURE 5 – CONTROL LOOP
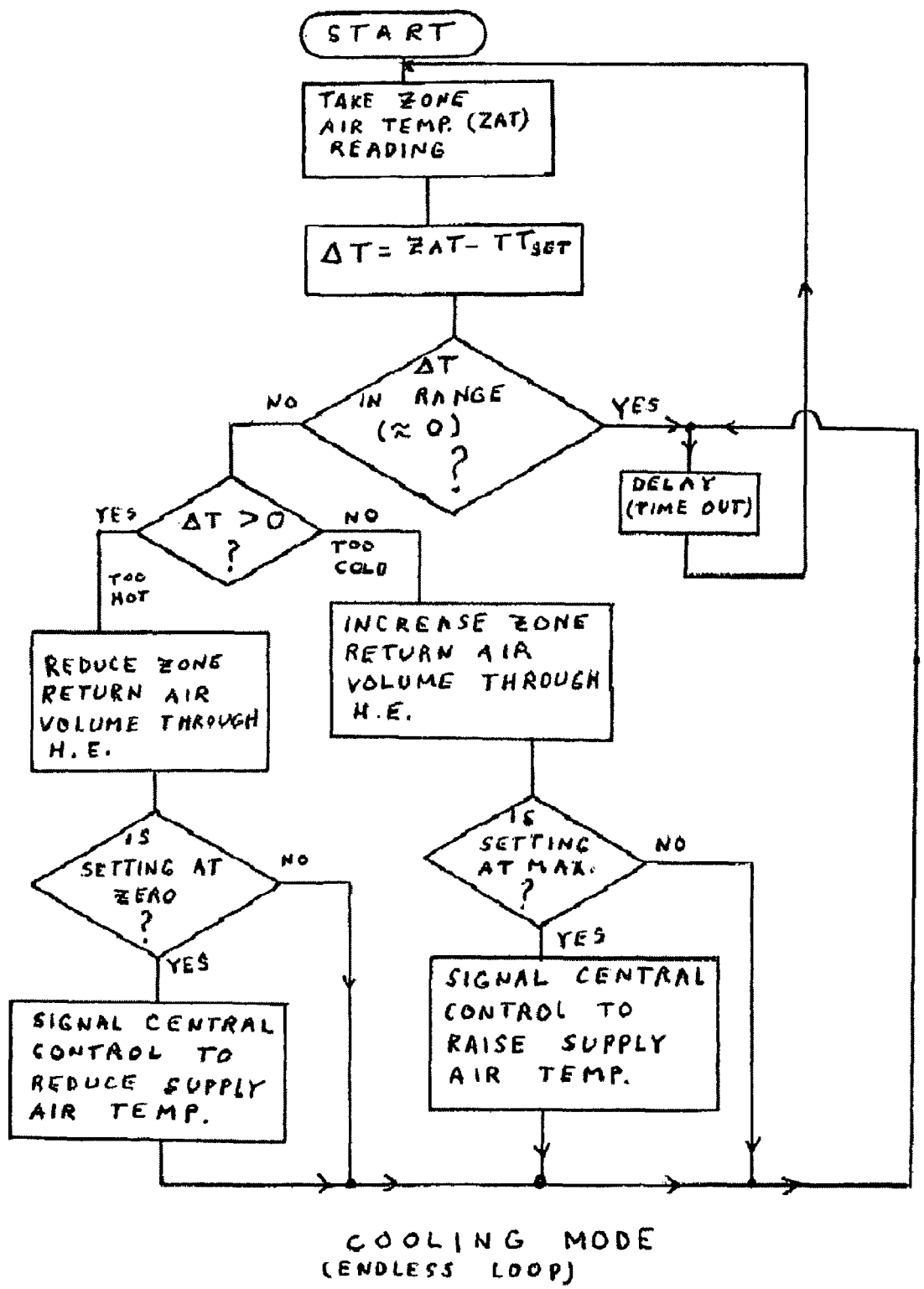

US 7,810,738 B2

CONSTANT AIR VOLUME/VARIABLE AIR TEMPERATURE ZONE TEMPERATURE AND HUMIDITY CONTROL SYSTEM

FIELD OF THE INVENTION

The present invention relates maintaining accurate temperature and humidity control in a multi-zone building with varying cooling and heating loads while maintaining an efficient continuous and fixed supply of total air and ventilation.

BACKGROUND OF THE INVENTION

Heating, ventilating and air conditioning (HVAC) systems serving multiple zones are classified according to the methods used to control the temperature and humidity in each zone. An early HVAC system commonly known as terminal reheat zone control was known to have superior space temperature and humidity control capability, but it was also known for consuming large amounts of energy in the cooling mode caused by the reheating process.

Another development in zone control came in the form of variable air volume (VAV) systems that regulate the supply air volume to a space in response to temperature requirement. These VAV systems, although good at controlling temperature, cannot ensure that the proper mixture of ventilation air reaches a room or zone because the total air volume varies with temperature needs. It is therefore not uncommon for the supply air volume to be low at a time of high occupancy, when a greater need for ventilation exists.

FIG. 2 is a prior art airflow diagram of a system, such as, for example, as in U.S. Pat. No. 6,789,618 B2 of Pearson with a face damper to regulate the volume of air passing through each heat exchanger in the system for maintaining zone temperature and a bypass damper to route excess return air to the return duct.

OBJECTS OF THE INVENTION

It is an object of the invention to provide energy-efficient temperature and humidity control with uniform ventilation air distribution in a constant-volume zoned heating and cooling system.

It is also an object to regulate the temperature of supply air to a space, using the temperature differential between supply air and return (room) air and regulating the flow of return air through a heat exchanger.

Other objects which become apparent from the following description of the present invention.

SUMMARY OF THE INVENTION

This invention is a system and method for providing accurate temperature and humidity control in a multi-zone building with varying space cooling and heating loads while maintaining a continuous and fixed supply of total air and ventilation air with high efficiency. The system is referred to by the trade name CAVVAT™.

This invention uses an air-to-air heat exchanger that regulates the temperature of the supply air of an airstream to a zone by using the temperature differential between supply air and return (room or zone) air and also regulating the flow of return air of the air stream through the heat exchanger. Although the effectiveness of this technique increases with the heat transfer efficiency of the heat exchanger, a wide variety of heat exchanger types and designs can be used. These include parallel flow, cross-flow, and counter-flow heat exchangers, heat pipes, and sensible heat as well as hygroscopic (Lossnay) types that are enthalpy exchange devices.

One or more dampers may be provided in the airstream. For example, a damper may be provided at an inlet of the heat exchanger or at an outlet of the heat exchanger, or elsewhere in the airstream. A damper need not be provided only at the inlet or outlet; it can be provided downstream or upstream thereof.

Two different system embodiments are identified in this invention. The first employs a single centralized return air blower or fan to pull return air through a controlled variable air volume face damper at the outlet of each heat exchanger in each zone. The first of these embodiments routes the excess return air in each zone (that which is not routed through the heat exchanger) to at-least-one pressure bypass-relief damper on the return air duct through free-flowing or direct ducting. The purpose of the at least one bypass-relief damper is to create constant negative pressure at the face damper that allows a full range of flow conditions. As the face dampers on the zones close, the relief-bypass opens to route more air to the return to maintain constant volume. The purpose of the bypass-relief damper is to create constant negative pressure at the face damper that allows a full range of flow conditions. As the face dampers on the zones close, the relief-bypass opens to route more air to the return to maintain constant volume. For example, the at-least-one bypass-relief damper maintains negative pressure inside the return air duct sufficient to draw air through each heat exchanger under maximum need conditions. As the face damper closes, negative pressure in the return duct increases and the at-least-one bypass-relief damper opens to allow a greater amount of bypass from the zone to the at-least-one bypass-relief damper. The centralized return air blower handles a constant return air volume through the return air duct connected to all zone heat exchangers and at-least-one bypass-relief damper.

The second embodiment uses a self-contained zone configuration wherein each zone has its own variable air volume return air blower or fan pulling air out of its local heat exchanger. The controllable return air blowers in each zone replace the variable air volume dampers of the first embodiment and eliminate the need for an extended return air ducting air from the heat exchangers to the centralized return air blower. Air leaving the fan at each unit is simply spilled into the ceiling plenum and returns free-flow to the central blower along with any bypass air that is also spilled into the ceiling plenum.

In all embodiments of the invention a heating device may be added at the exit of the heat exchanger before air is introduced to the zone. This heating device would be available to provide auxiliary heat when the system is in the cooling mode and full flow through the heat exchanger face damper is insufficient to avoid over-cooling the zone. The heating device could also be the primary or secondary form of heat when the system has switched to the heating mode.

BRIEF DESCRIPTION OF THE DRAWINGS

The present invention can best be understood in connection with the accompanying drawings. It is noted that the invention is not limited to the precise embodiments shown in drawings, in which:

FIG. 1 is an airflow diagram of a first embodiment CAVVAT™ system of this invention with a face damper to regulate the volume of air passing through each heat exchanger in the system for maintaining zone temperature and at-least-one bypass-relief damper in the return duct to accept excess return air and maintain a constant negative pressure at the outlet of each face damper. Return air to heat exchanger and to at-least-one bypass-relief damper is either free-flow or directly connected. Return air leaving heat exchanger and face damper is directly connected to return air duct.

FIG. 2 is a prior art airflow diagram of a prior art air flow such as in U.S. Pat. No. 6,789,618 B2 of Pearson.

FIG. 3 is an airflow diagram of a third embodiment CAVVAT™ system of this invention with a modulating fan to regulate the volume of air passing through each heat exchanger in the system for maintaining zone temperature. Return air leaving heat exchanger and modulating fan, free-flow to return air opening. Return air to heat exchanger is directly connected to avoid drawing in cold air that may be spilling from adjacent zones. This system can reduce the requirement for lengthy return air ducts. A ceiling plenum is necessary here to prevent cold return air from falling into the zone.

FIG. 4 is a table showing the three embodiments and various options of each.

FIG. 5 is a flow chart showing a cooling mode control flow method for a CAVVAT™ system of this invention.

DETAILED DESCRIPTION OF THE INVENTION

With the CAVVAT™ systems of this invention it is possible to have condensation in the heat exchanger during morning startup when the room dew-point temperature may be higher than the cold supply air temperature. This condensation can be adequately handled in a number of ways. Most directly, a drain connection can be provided and piped to a nearby drain. The use of a hygroscopic or Lossnay style heat exchanger will simply allow the moisture to pass through to the supply airstream. Another method of dealing with condensate is to use a hygroscopic coating on the interior surface of a metal heat exchanger which will allow the condensed moisture to be spread over a wide area permitting its evaporation into the return air stream. Yet another method is to place moisture absorbing material (such as sponge) at the point where condensate collects to absorb this limited amount of startup moisture; when the dew point drops, this moisture will evaporate into the return airstream.

FIGS. 1 and 3 illustrate two different embodiments of the CAVVAT™ system of this invention. The common elements of each embodiment include the following features and items. A constant volume central air handling unit 2, that delivers air at a controlled dew point temperature to ensure desirable zone humidity, is used with a constant air volume supply air duct 3 ducted 12 to each heat exchanger 7 in each zone (three illustrated) and distributing supply air at output 10 to each zone. Return air enters ceiling input 9, a variable amount enters heat exchanger 7 at airstream 11, and the excess return air 18 is routed to the return in one of the methods outlined in FIGS. 1 and 3. An optional return air fan may be used to reduce static pressure on the central air handler. Additional heating can be accomplished using an optional beating device 20.

FIG. 1 uses centralized return from a constant air volume blower in central air handler 2 to draw return air through variable air volume face damper 8 in each zone at the return air outlet of each heat exchanger 7 using return duct 17. It is face damper 8 that is controlled to adjust the air temperature of each zone. Excess return air exits input 9 in each zone and is directly ducted or drawn into the ceiling plenum and is returned as variable stream 18 to at-least-one bypass-relief damper 16 and then onto central air handler 2.

FIG. 3 uses centralized return from a constant air volume blower in central air handler 2 to draw return air through input 9 and variable volume fan 21 with a direct connection between input 9 and heat exchange airstream 11 with bypass air 18 continuing on to the ceiling plenum and a modulating fan 21 at the outlet of each heat exchanger 7 to draw a variable amount of air across the heat exchanger 7 for zone temperature control before being discharged into the ceiling plenum and then onto central air handler 2.

While FIG. 1 shows damper 8 located at an outlet of each heat exchanger 7, it is noted that alternatively damper 8 can be located at an inlet of heat exchanger 7, or damper 8 can be located elsewhere upstream or downstream of heat exchanger 7, or combinations thereof.

Likewise, while FIG. 3 shows variable volume fan 21 located at the outlet of heat exchanger 21, it is noted that it can also be located at an inlet to heat exchanger 7, or elsewhere upstream or downstream of heat exchanger 7, or combinations thereof.

FIG. 4 shows the various combinations that are used in CAVVAT™ systems.

FIG. 5 illustrates a possible control loop for the cooling mode of operation. Other similar control loops can be used as well as long as the basic method of zone temperature control by regulating the rooms return air volume through the heat exchanger is followed. The flow chart of FIG. 5 is compatible with all three embodiments of CAVVAT™ systems of this invention.

In FIG. 5, after starting the endless control loop, the air temperature of the zone (ZAT) is measured. Then it is compared with the thermostat setting thereby calculating "delta T" ($\Delta T$). If the temperature is within the pass band of the desired temperature, a short delay of the same order as the thermometer is taken and then the flow is again started at the top. If delta T ($\Delta T$) is positive, the zone is too hot, therefore the zone return air volume is reduced through the heat exchanger; this might involve reducing flow through an adjustable damper or reducing the speed of the self-contained blower in the zone. If the setting were at zero flow of return air through the heat exchanger, the central air handling unit is signaled to reduce supply air temperature. If delta T ($\Delta T$) were negative, this would indicate a zone that is too cold. Thus the return air volume through the zone heat exchanger would then be increased. If the setting were at max, the central air handling unit would be signaled to raise supply air temperature.

Also with respect to FIG. 5, the same flow can be used with minor changes to represent a heating mode. Namely, the delta T ($\Delta T$) greater than zero decision block is changed to less than zero, "too hot" and "too cold" comments are reversed and "raise" or "reduce" temperature are also switched. The amount of air volume change every time through the loop can be a fixed increment, an increment based on "delta T" ($\Delta T$), or the result of a complex algorithm based on several parameters. The control operations can be analog or digital.

In the foregoing description, certain terms and visual depictions are illustrative only: However, no unnecessary limitations are to be construed by the terms used or illustrations depicted, beyond what is shown in the prior art, since the terms and illustrations are exemplary only and are not meant to limit the scope of the present invention.

It is further noted that other modifications may be made to the present invention, without departing from the scope of the invention, as noted in the appended claims.

I claim:

1. A constant volume zoned heating and cooling air control system in a multiple zoned building comprising:
   each zone having an output for supplying conditioned air to said zone and an input for receiving return air from said zone;

a constant volume central air handling unit for delivering temperature and humidity controlled air through a constant air volume supply air duct to all of said outputs;

a return air duct for delivering return air from all of said zones to said central air handling unit;

a heat exchanger for each zone for exchanging heat between air from said central air handling unit to said output and return air from each input to said return air duct;

a free flow bypass for return air from the outlet of each zone to said return duct; and, at least one modulating fan upstream or downstream of said heat exchanger leading to said return duct for controlling temperature within each of said zones by controlling return air volume through the heat exchanger for each zone.

2. A constant air volume/variable air heating and cooling zone control system comprising:

a plurality of zones each having an output for supplying conditioned air of an air stream to said zone and an input for receiving return air from said zone;

a constant volume central air handling unit for delivering temperature and humidity controlled air through a constant air volume supply air duct to all of said outputs;

a return air duct for delivering return air from all of said zones to said central air handling unit;

a heat exchanger for each zone for exchanging heat between air from said central air handling unit to said output and return air from each input to said return air duct;

means for controlling temperature within each of said zones by controlling return air volume through the heat exchanger for each zone comprising a controllable face damper located in at least one of a) upstream of said heat exchanger, at an inlet of said heat exchanger, at the return air outlet of the heat exchanger, or b) downstream from the return air outlet of said heat exchanger, or combinations thereof;

a bypass from an airstream of return air to said heat exchanger from said input to said return air duct bypassing said heat exchanger, whereby control of said controllable damper effectively controls the temperature within the zone associated with said controllable damper; and, the bypassed airstream of return air from said input being routed through a bypass relief damper to said return air duct, whereby said bypass-relief damper creates constant negative pressure at the face damper thereby allowing a full range of flow conditions, wherein further as each said face damper on a zone closes, said bypass relief damper opens to route more air to the return to maintain constant air volume.

3. The control system of claim 2 in which said heat exchanger is in a return air plenum above a ceiling in each zone.

4. A constant volume zoned heating and cooling air control system in a multiple zoned building comprising:

each zone having an output for supplying conditioned air to said zone and an input for receiving return air from said zone;

a constant volume central air handling unit for delivering temperature and humidity controlled heating and cooling air through a constant air volume supply air duct to all of said outputs;

a return air duct for delivering return air from all of said zones to said central air handling unit;

a heat exchanger for each zone for exchanging heat between air from said central air handling unit to said output and return air from each input to said return air duct;

a variable air volume face damper in each zone at a return air outlet of said heat exchanger to adjust the temperature in each zone; and a bypass-relief damper in a bypass for return air from each zone to said return duct to create a constant negative pressure at said face damper that allows a full range of flow conditions.

* * * * *